Jan. 17, 1967    E. L. WATHEN    3,298,121

TIRE DISPLAY AND ADVERTISING DEVICE

Filed Nov. 19, 1964

INVENTOR.
ERNEST LESLIE WATHEN
BY
*[signature]*
his ATTORNEY

Patented Jan. 17, 1967

3,298,121
TIRE DISPLAY AND ADVERTISING DEVICE
Ernest Leslie Wathen, 20695 Stratford Ave.,
Rocky River, Ohio 44116
Filed Nov. 19, 1964, Ser. No. 412,569
6 Claims. (Cl. 40—125)

This invention relates to a display and advertising device for attachment to an unmounted vehicle tire and which is made from a blank formed from a single sheet of relatively stiff material such as cardboard or plastic material and which is provided with score or squeeze lines so arranged that portions of the blank are provided for hidden engagement under compression, through the opening in the tire, with the side walls and bead thereof to removably support the device in a selected display position on the tire.

An object of the invention is a display device of extremely simple construction for attachment to an unmounted vehicle tire and which is very low in manufacturing cost.

Another object is a device of this character which is provided with integral portions adapted to be disposed, by bending or folding about score or squeeze lines, to form gripping members for engagement with the beads and a side wall of the tire under pressure.

A further object is a display device formed of a single sheet of stiff material with foldable portions insertable into or through the central open portion of the tire for quick and easy application or removal in use.

Still another object is the provision of gripping means in a device of this type insertable into the tire opening and engageable under compression with the inner and peripheral walls of the tire beads to provide an effective gripping means, whereby the device, while easily removable from the tire, is prevented from accidental removal or displacement from a selected adjustment on the tire when it is installed for use.

Other objects and advantages of this invention will become more apparent as the following description of an embodiment thereof progresses, reference being made to the accompanying drawing in which like reference characters are employed to designate like parts througout the same.

Figure 1:
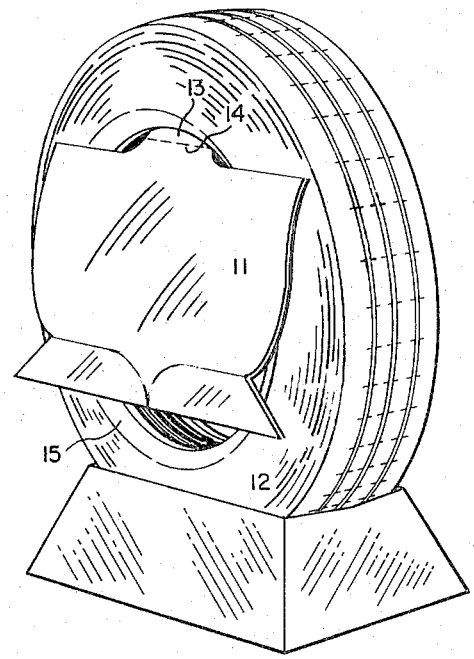
FIGURE 1 is a perspective view of a form of my invention shown assembled on an unmounted vehicle tire to provide a display or for advertising purposes.

Referring more particularly to the drawing, a form of the device embodying my invention is illustrated and consists of a sheet of relatively stiff material such as cardboard, plastic or similar material die cut and scored or creased to provide a plurality of sections which can be folded or bent out of the plane of the blank body to form a unique display and advertising device removably insertable in the central opening of an unmounted vehicle tire and held in a selected position against accidental displacement, by forces of compression generated and exerted by certain of the folded or bent sections of the blank against the tire beads and side walls. The tire is preferably supported in a vertical position, as on a base as shown in FIGURE 1.

Figure 3:
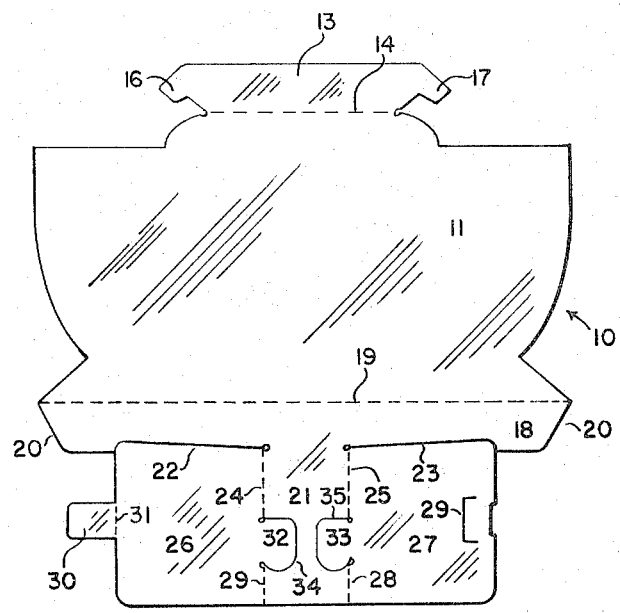
FIGURE 3 is a layout of the blank from which the device is formed.

More particularly, as shown, the blank 10 includes a display panel or section 11 of transversely elongate form and of sufficient dimensions to overlie opposed portions of the forward face of a tire side wall 12, a top section 13 squeeze scored at 14 to form a transverse supporting panel insertable through the tire opening formed by the beads 15 and terminating in its opposed ends in tabs 16 and 17 for engagement with the inner surfaces of the front bead and adjacent side wall 12 to draw the top and edges of the panel into engagement with the outer surface of the side wall under a degree of compression when the device is assembled in a tire. The blank is also formed with a portion 18 along and depending from the squeeze or cut score line indicated at 19. The portion 18 is adapted to be bent or folded along the score line in a rearward direction and terminates at its ends in downwardly converging edges 20 (see FIGURE 3), which ends are disposed in the tire opening and are supported on the forward bead of the tire.

Figure 2:
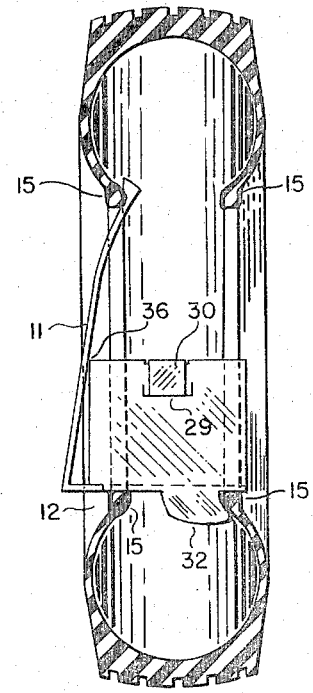
FIGURE 2 is a vertical central section through the device mounted in a tire as illustrated in FIGURE 1.
Figure 4:
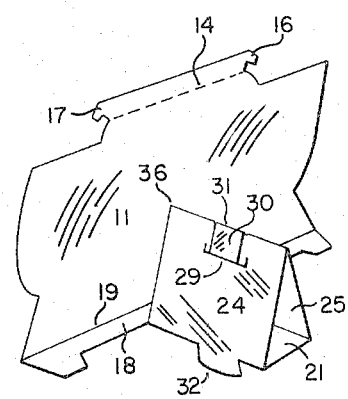
FIGURE 4 is a reduced rear perspective view of the device illustrating how it is formed from the blank.

An extension 21 of the portion 18 is formed by the cut lines 22 and 23 extending outwardly in opposite directions from the score lines 24 and 25, respectively, to form a pair of lateral walls 26 and 27 adapted to be disposed upwardly, as in FIGURE 4, and converging at their free ends, as at 28, in the form of an easel. The wall 27 is slit at 29 to receive a locking tab 30 carried by the wall 26. This tab is bent on the squeeze line 31 for insertion into the slit whereby to lock the parts together, as illustrated in FIGURES 2 and 4. A pair of tabs 32 and 33 are integral with the respective walls 26 and 27 and, of course, are severed from the extension 21 at 34 and 35. These tabs 32 and 33 engage the inner surfaces of the rear bead and the side wall of the tire, while the extension 21 is of sufficient length to overlie the two beads and to be supported thereon, as in FIGURE 2.

It will be seen that by such construction, and when the blank is formed along the score and cut lines, as hereinbefore described and as illustrated in the drawing, forces of compression are generated in the device by virtue of the tabs 32 and 33 in engagement with the inner walls of the rear bead and side wall of the tire at the base of the display device and also by engagement by the ends of the section 18 with the inner walls of the forward bead and side walls, at the top of the device. It will be noted that the panel 11, when the device is in assembled position, as in FIGURES 2 and 4, will be engaged by the converging walls at their meeting edges forming the apex of the easel, as indicated at 36. At this point, there is provided a kind of fulcrum about which the panel 11 is put under stress to generate forces of compression not only exerted through the portion 13 to the outer bead and side wall of the tire but also through the tabs 32 and 33 against the inner bead and side wall surfaces.

It will readily be seen that the device can be assembled on an unmounted tire through the central opening thereof in the manner described, and held in place in a selected position by forces of compression exerted by portions of the device against the tire side walls and beads, thus eliminating the likelihood of accidental displacement either by contact with other objects or under the influence of strong wind currents.

Various changes may be made in the details of construction and arrangement of parts of the invention without departing from the spirit thereof or the scope of the appended claims.

I claim:

1. A display and advertising device for assembly in the opening of an unmounted vehicle tire and formed from a single sheet of relatively stiff bendable material comprising, as a unitary structure an intermediate display panel, a transverse top portion extending from a score line formed at the juncture of the portion and the panel, a supporting member extending from the panel along the score line forming the juncture of the supporting portion and the panel, means formed on the top portion and insertable within the tire opening to engage and overlie the inner surfaces of the adjacent bead and side wall of the tire, and means formed on the supporting portion and insertable in the tire opening to engage the inner adjacent surfaces of the opposite bead of the tire and the side wall of the tire contiguous with said last named means, said last named means engaging the inner surface of said display panel and exerting a force of compression thereagainst to flex the panel outwardly of the tire and thereby to sustain the panel in supported position on the tire.

2. The invention defined in claim 1 in which the supporting member consists of a portion for overlying the tire beads, and a pair of oppositely disposed walls foldable about respective score lines formed in said member and forming, when folded, an apex in said member for pressure engagement with the panel inner surface.

3. The invention as defined in claim 1 in which the opposed ends of the top transverse portion are provided with gripping tabs engageable with the bead and side wall inner surfaces adjacent the display panel.

4. The invention as defined in claim 1 in which the panel is caused to be flexed outwardly of the tire by forces of compression exerted by engagement of the support member with the central panel inner surface while the panel is under the holding influence of the transverse top portion in engagement with a bead of the tire.

5. A display and advertising device for assembly in the opening of an unmounted vehicle tire and formed from a single sheet of relatively stiff bendable material comprising, as a unitary structure an intermediate display panel, a transverse top portion extending from a score line formed at the juncture of the portion and the panel, a supporting portion depending from the panel along the score line forming the juncture of the supporting portion and the panel, means formed on the top portion and insertable within the tire opening to engage and overlie the inner surfaces of the adjacent bead and side wall of the tire, and means formed on the supporting portion and insertable in the tire opening to rest upon and bridge the tire beads and to engage the inner adjacent surfaces of the opposite bead of the tire and the side wall of the tire contiguous with said last named means, said last named means engaging the inner surface of said display panel and exerting a force of compression thereagainst to flex the panel outwardly of the tire and thereby to sustain the panel in position on the tire.

6. The invention as defined in claim 5 in which the panel is caused to be flexed outwardly of the tire by forces of compression exerted by engagement of the support member with the central panel inner surface while the panel is under the holding influence of the transverse top portion in engagement with a bead of the tire.

References Cited by the Examiner

UNITED STATES PATENTS

| 1,702,469 | 2/1929 | Epstein | 40—125 |
| 2,177,467 | 10/1939 | Sunderhauf | 40—129 |
| 2,517,884 | 8/1950 | Kies | 40—125 |
| 2,774,163 | 12/1956 | Wathen | 40—125 |
| 3,141,252 | 7/1964 | Mullen | 40—125 |

EUGENE R. CAPOZIO, *Primary Examiner.*

HERBERT F. ROSS, *Examiner.*